United States Patent
Lehmann

(10) Patent No.: US 8,920,861 B2
(45) Date of Patent: Dec. 30, 2014

(54) PROCESS FOR OBTAINING A CONSTITUENT FROM WHEY PROTEIN CONCENTRATE

(75) Inventor: Hanno Lehmann, Sundern (DE)

(73) Assignee: Molkerei Alois Mueller GmbH & Co. KG (DE)

( * ) Notice: Subject to any disclaimer, the term of this patent is extended or adjusted under 35 U.S.C. 154(b) by 0 days.

(21) Appl. No.: 14/003,628

(22) PCT Filed: Mar. 7, 2012

(86) PCT No.: PCT/EP2012/001013
§ 371 (c)(1),
(2), (4) Date: Dec. 31, 2013

(87) PCT Pub. No.: WO2012/119768
PCT Pub. Date: Sep. 13, 2012

(65) Prior Publication Data
US 2014/0106044 A1    Apr. 17, 2014

(30) Foreign Application Priority Data

Mar. 7, 2011  (EP) ..................................... 11001863

(51) Int. Cl.
*A23J 1/20* (2006.01)
*A23C 9/142* (2006.01)

(52) U.S. Cl.
CPC ............... *A23J 1/205* (2013.01); *A23C 9/1425* (2013.01); *A23V 2002/00* (2013.01)

USPC ........... 426/480; 426/583; 426/580; 426/491; 426/478

(58) Field of Classification Search
CPC ............... A61K 35/20; A23C 2210/20; A23C 2210/202; A23C 2210/204; A23C 2210/258
USPC .......................... 426/480, 583, 580, 491, 478
See application file for complete search history.

(56) References Cited

U.S. PATENT DOCUMENTS

| 4,897,279 | A | * | 1/1990 | Lehmann et al. | 426/583 |
| 5,747,647 | A | * | 5/1998 | Stack et al. | 530/365 |
| 6,288,222 | B1 | * | 9/2001 | Roth et al. | 536/127 |
| 6,866,879 | B1 | * | 3/2005 | Vaarala et al. | 426/580 |
| 8,389,039 | B2 | * | 3/2013 | Wu et al. | 426/583 |

FOREIGN PATENT DOCUMENTS

| DE | 3800468 A1 | 7/1989 |
| WO | WO 02/080695 A1 | 10/2002 |

OTHER PUBLICATIONS

International Preliminary Report on Patentability for priority application PCT/EP2012/001013 dated Sep. 19, 2013 (9 pgs).

* cited by examiner

*Primary Examiner* — Anthony Weier
(74) *Attorney, Agent, or Firm* — Stinson Leonard Street LLP

(57) ABSTRACT

For increasing the yield, a process for obtaining a constituent from whey protein concentrate by microfiltration (4) provides for separating from the retentate stream from the microfiltration (4) a reduced-fat substream (14) in two stages (5.1, 5.2) and recirculating it to microfiltration (4).

20 Claims, 4 Drawing Sheets

PROCESS FOR OBTAINING A CONSTITUENT FROM WHEY PROTEIN CONCENTRATE

Figure 1:
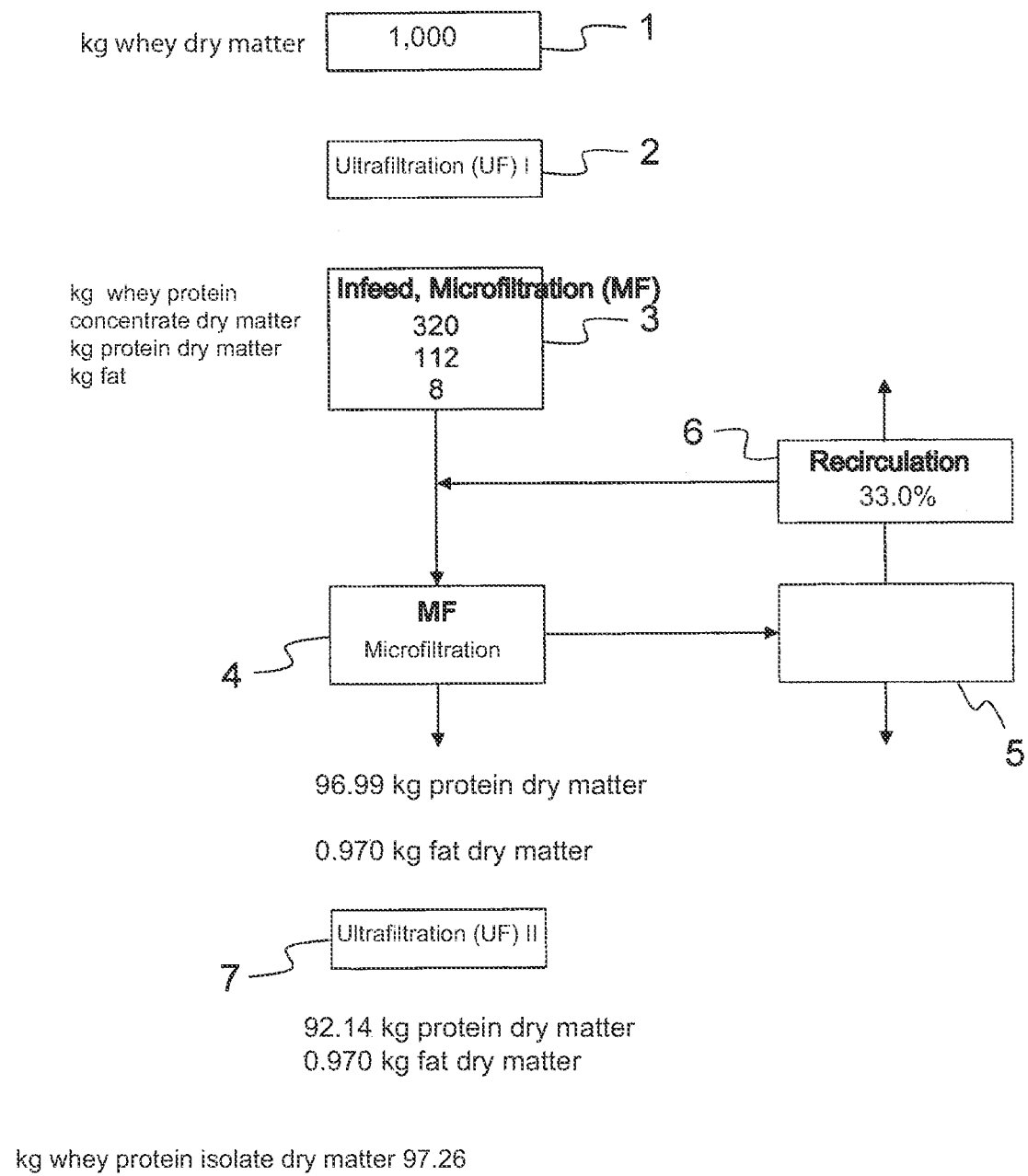

The invention relates to a process for obtaining a constituent from a whey protein concentrate obtained as retentate from ultrafiltration of whey, wherein the whey protein concentrate is supplied as a feed stream to a microfiltration arrangement, and from its retentate stream, a reduced-fat substream is separated and at least partially recirculated into the microfiltration arrangement.

Abbreviated, a whey protein concentrate, obtained as a retentate from an ultrafiltration of whey in prior art processes of this type, is also called "WPC (Whey Protein Concentrate). It also contains, in addition to a whey protein fraction that is higher than that of whey, a fraction of residual fats from the whey. Increasing the protein concentration is particularly desirable for nutritional purposes, while the fat fraction is undesirable. For reducing this unwanted fat fraction, the whey protein concentrate is subjected to microfiltration. In the permeate from this microfiltration, the fat fraction is substantially reduced compared to that of the whey protein concentrate, so that, from this permeate, a substantially reduced-fat, protein-enriched product can be obtained. In microfiltration, however, a substantial fraction of protein is lost to the microfiltration retentate, thereby reducing the total yield.

The invention is based on the objective of improving the total yield in a process of the type mentioned in the preamble.

According to the invention, this objective is achieved in that, in a first stage, the retentate stream is separated into a first fat-enriched substream and a first fat-depleted substream, in a second stage, the first fat-depleted substream is separated into a second fat-enriched substream and a second fat-depleted substream, and the recirculated substream is fed from the first and the second fat-depleted substream.

During microfiltration, part of the constituents contained in the incoming whey protein concentrate, in particular of the protein, passes into the retentate stream. As a result, the protein fraction discharged in the permeate stream is reduced. In practice, the protein yield in the permeate stream is in the range of 75% to 80% of the protein content present in the incoming whey protein concentrate. As a result of the invention-based recirculation of the reduced-fat substream separated from the retentate stream from microfiltration, a significant increase of the protein yield in the permeate stream from microfiltration is achieved and, nevertheless, the fat content in the permeate stream is maintained at desired low values. In practice, this increase in yield is, for instance, in the range from 5% to 10% of the protein fraction present in the incoming whey protein concentrate. The values for the yield increase and suppression of the fat content depend on the recirculation quantity. In particular, the process according to the invention can be executed with satisfactory success if the amount of the recirculated substream is for example in the range of 25% to 75% of the quantity of the separated reduced-fat fat substream or the quantity of the retentate stream of microfiltration.

The residual fat content recirculated with the recirculated substream is retained by the microfiltration membrane according to the degree of separation of the microfiltration arrangement applicable to fat, hence according to the natural defatting degree of the latter, so that only a corresponding small fraction of the residual fat content passes into the permeate stream. The natural degree of defatting of microfiltration is in the range of 75% to 80%, for instance. Then the fraction passing into the permeate is reduced to a value in the range of 20% to 25% of the recirculated residual fat content.

However, the fat content of the microfiltration retentates of whey has about 8 to 15 times the fat content of the whey per se. In view of these high values, the invention allows large-scale economical production by executing preliminary defatting in the first stage. Preferably, in this stage, the retentate, having a dry matter content of 10% to 20%, for instance, is reduced to a dry matter content of 5% to 7%. For this purpose, as a diluent, a reverse osmosis permeate that occurs in the overall process flow of a dairy operation from a reverse osmosis process can, for instance, be used. This achieves a viscosity that is beneficial for efficient skimming. Before the separation in a cream separator, warming to 40 °C to 50 °C takes place. The separated first fat-depleted substream from the cream separator is separated in the second stage by chemical-physical action. From the second fat-depleted substream occurring during this stage, the recirculation to the microfiltration arrangement is fed. From the first and the second fat-enriched substreams, a phospholipid concentrate, and from it, a phospholipid powder can be obtained.

The invention expediently provides that, ahead of the separation of the second fat-depleted substream, the pH of the substream fed into the second stage is adjusted, the pH-adjusted substream is heated, and the bivalent metal ion concentration of the heated substream is increased. The adjustment of the pH prior to heating and the increase in the bivalent metal ion concentration after heating cause an aggregation of the residual fat particles and thereby facilitate separation of the fat-depleted substream. Separation is further enhanced in that advantageously the substream from separation, adjusted in its pH-value and its bivalent metal ion concentration, is supplied via a temperature holding line.

In practice, the dwell period on the temperature holding line is expediently two to ten minutes. Moreover, the substream heating temperature is in the range from 50 °C to 65 °C. The adjustment of the pH to a value in the range of 6.4 to 7.0 takes place by the addition of alkali, such as potassium hydroxide solution or sodium hydroxide solution. The increase in the bivalent metal ion concentration takes place by an addition of calcium chloride. Preferably, the second fat-depleted substream is separated from the heated substream using a plate separator. The plate separator can be designed as a two-phase separator, also called clarifying separator or clarifier, the discharge stream of which, that discharges the light phase, delivers the second fat-depleted substream. Alternatively, the plate separator can be a three-phase separator, also called separating separator, the discharge stream of which, that discharges the heavy phase, delivers the second fat-depleted substream. This possibility offers the advantage of separating not yet aggregated fat fractions as light phase and thereby of further increasing the quality of the treated retentate.

The scope of the invention furthermore provides for the protein-enriched product to be obtained from a retentate stream of further ultrafiltration, to which the permeate stream from the microfiltration is fed as a feed stream. As a result of the further ultrafiltration, the protein-enriched and reduced-fat permeate stream from microfiltration is further fractionated and cleaned. The retentate stream from this further ultrafiltration delivers a highly protein-enriched and substantially reduced-fat product, the protein content of which is, for instance, near or above 90% and the fat content of which is less than 1%. Abbreviated, this product is also referred to as WPI (whey protein isolates.)

Figure 2:
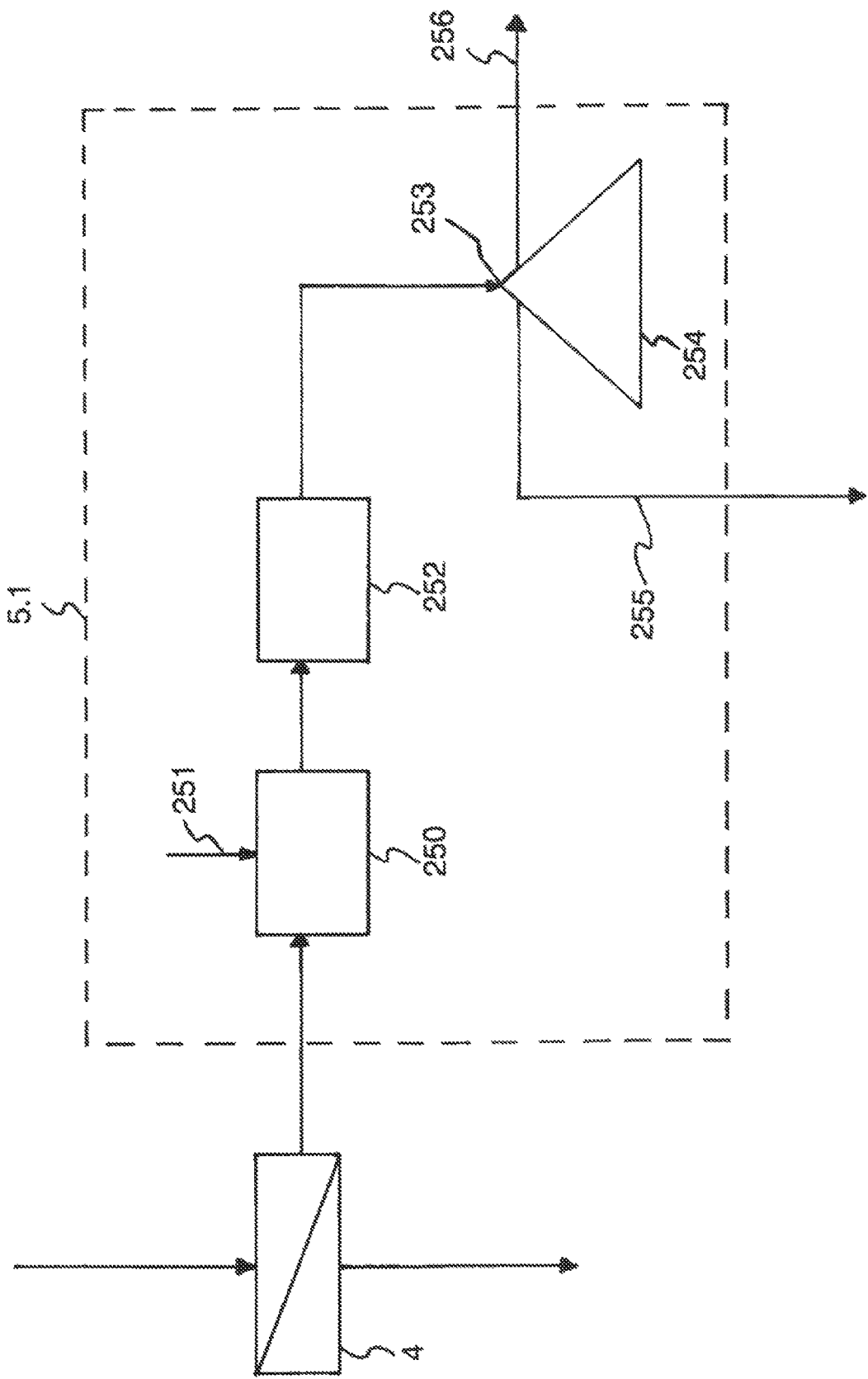
Figure 2B:
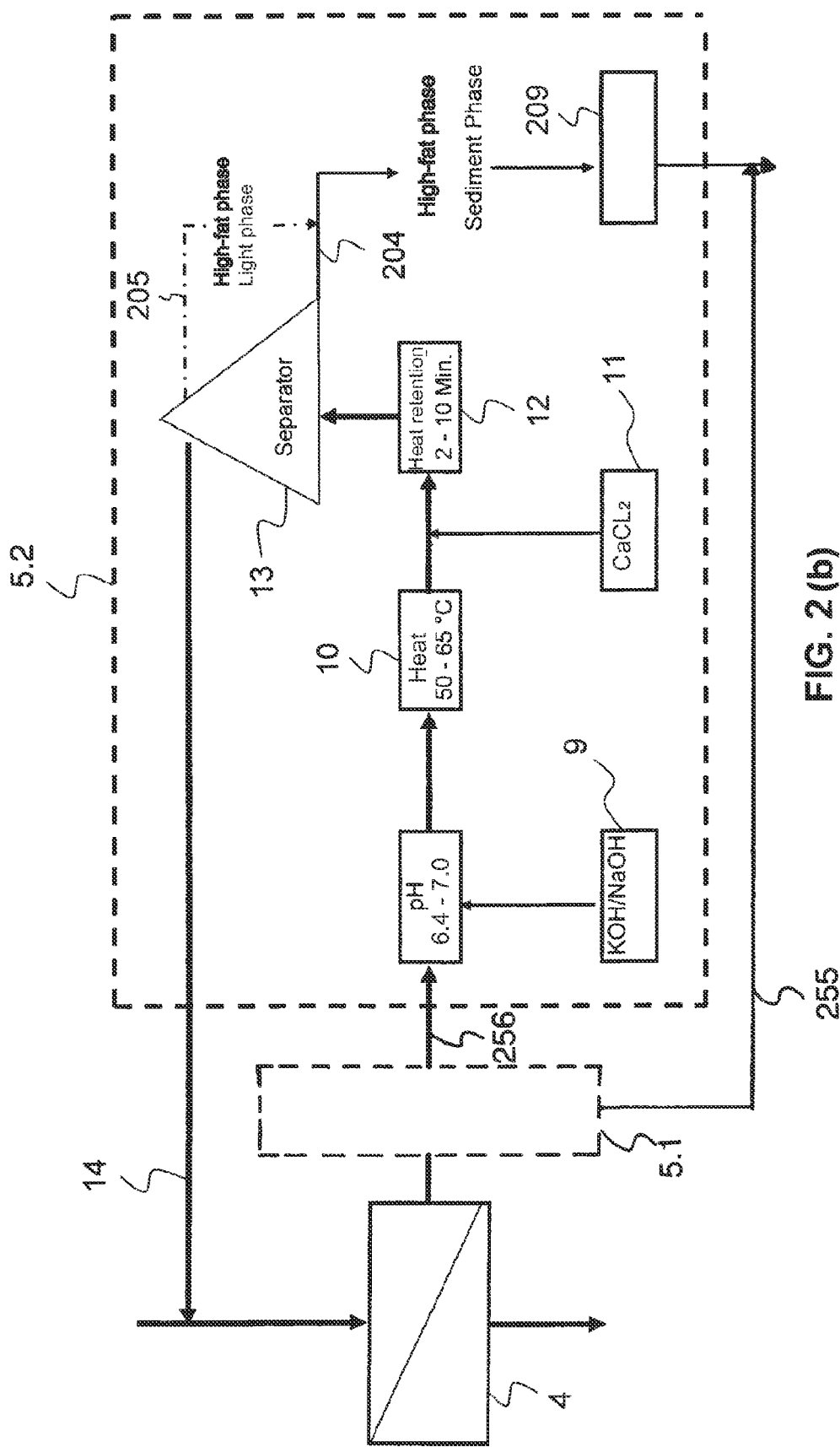
Figure 3:
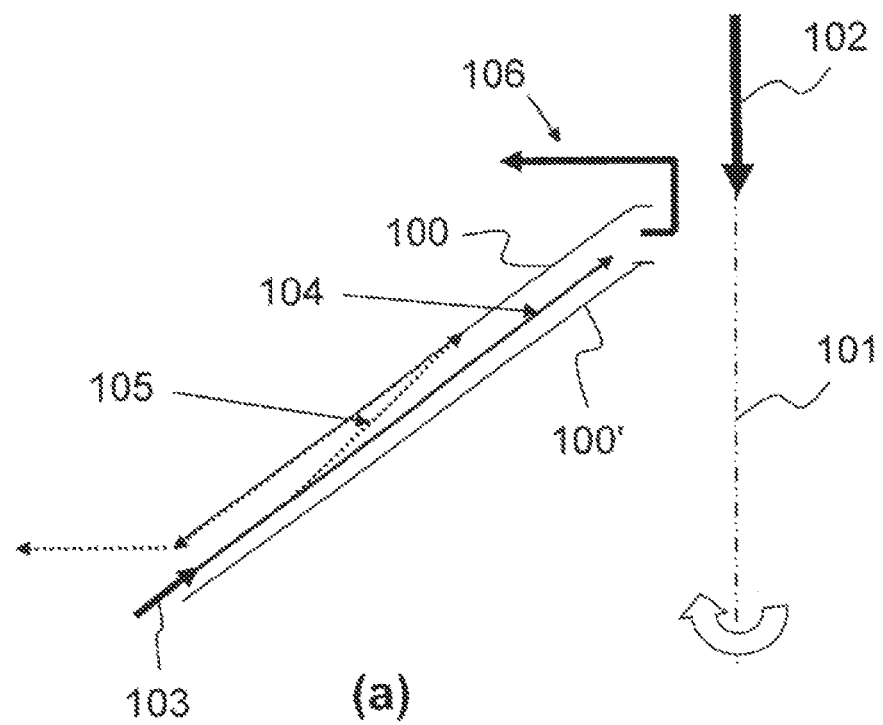
Figure 3:
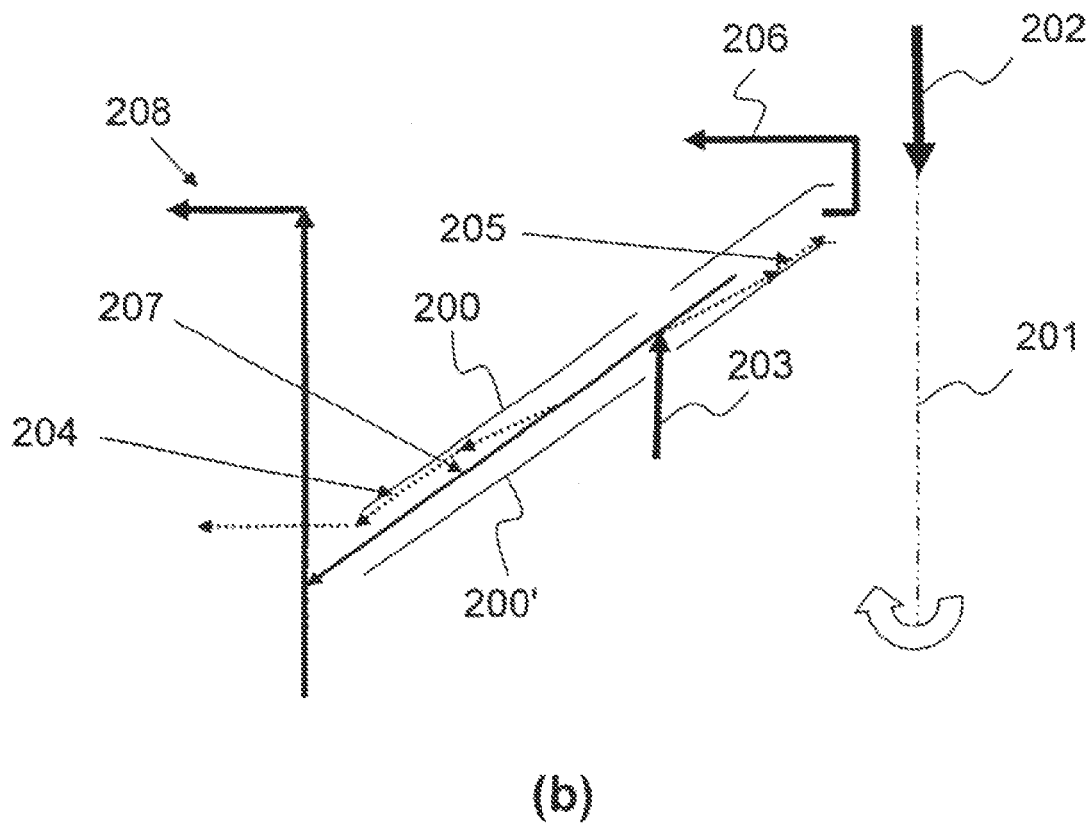

In the following specification, the invention is exemplified with reference to the drawings, the following being shown therein:

FIG. 1 shows a block diagram of a process flow, in which the invention is applied, FIGS. 2(a) and 2(b) show detailed representations of sections of FIG. 1, and FIGS. 3(a) and 3(b) show, in each case, one schematic for explaining the separation effect in a clarifying separator and a separating separator respectively.

In FIG. 1, a Block 1 symbolizes whey as the starting material of the represented process flow. For explaining the mass balances that occur in this process flow, in Block 1, exemplary only, a total throughput of whey having a dry matter content (TM) of 1,000 kg is assumed. The whey is conducted to an ultrafiltration stage 2, in which it is fractionated into a permeate and a retentate. The permeate from this ultrafiltration, in which, in particular, the lactose and minerals of the whey are enriched, is supplied to a further application not presented in FIG. 1.

In the retentate from ultrafiltration, the whey proteins are enriched. Moreover, the retentate contains a residual fraction of whey fat. For this whey protein concentrate, abbreviated also called "WPC", in Block 3, the WPC mass balance, calculated from the mass balance indicated in Block 1 and based on practice-oriented assumptions, is indicated, namely 320 kg of dry matter. Contained therein are 112 kg protein dry matter and 8 kg fat dry matter.

The whey protein concentrate composed in such a way is supplied as a feed stream to a microfiltration stage 4. During this microfiltration, most of the protein fraction of the supplied whey protein concentrate passes into the permeate of the microfiltration stage 4. In contrast, the fat content of this permeate is substantially reduced.

A smaller portion of the protein fraction and a larger portion of the fat fraction pass into the retentate from microfiltration. In a separation stage 5, from the retentate stream from microfiltration stage 4, a reduced-fat substream is separated. A Block 6 symbolizes the recirculation of a portion of this substream into the feed of microfiltration stage 4. The size of this portion is indicated as 33% in Block 6. In fact, the size of the portion can be varied within a wide range, depending on the circumstances that exist in actual practice, in order to set an optimal yield, e.g. in the range of 25% to 75% of the reduced-fat substream separated in separation stage 5.

Using this recirculation, for the exemplary mass balance on which FIG. 1 is based, in the permeate from microfiltration stage 4, calculation results in a dry matter content of 96.99 kg for protein and of 0.97 kg for fat. If, instead, the process were allowed to run without the recirculation, the permeate from microfiltration stage 4 would only contain 89.60 kg of protein dry matter with 0.4 kg of fat dry matter. This means an increase of 8.25% in the protein yield. At the same time, the percentual fat content continues to remain below a threshold value of 1%, as desired for nutritional purposes.

In the overall process represented in FIG. 1, the permeate from microfiltration stage 4 is additionally subjected to a post-treatment for the purpose of cleaning and further fractionation. For this purpose, the permeate stream is supplied to an additional ultrafiltration stage 7 as feed stream. Its retentate provides a directly usable protein-enriched product having a protein content of 90% and a fat content of 0.95%. Abbreviated, such a product is called "WPI" (whey protein isolate).

FIG. 2(a) shows details of an embodiment of a first stage 5.1 of separation stage 5 of FIG. 1. In this stage 5.1, in a process step 250, the dry matter content of the retentate stream from microfiltration stage 4, supplied at a dry matter content of 10% to 20%, is reduced to a dry matter content of 5% to 7%. This takes place for example via infeed 251 of water or permeate from a reverse osmosis process, which takes place at a different location of the overall process flow of a dairy operation. In a subsequent process step 252, the dry matter-reduced permeate is heated to 40 °C to 55 °C and subsequently supplied to input 253 of a cream separator 254. Its separation principle is explained in exemplary form based on FIG. 3 (b).

In cream separator 254, the supplied pre-treated retentate stream is separated into a first fat-enriched substream 255 and a first fat-depleted substream 256.

In FIG. 2(b), within an area bordered by a dashed line, an embodiment of a second stage 5.2 of separation stage 5 of FIG. 1 is illustrated in more detail. This representation shows that the pH of the first fat-depleted substream 256, supplied from the first stage 5.1, is increased to a value in the range of 6.4 to 7.0 by an addition of alkali, such as potassium hydroxide and/or sodium hydroxide solution from a vessel 9. The temperature of the substream ph-adjusted in this manner is, for instance while passing through a plate heat exchanger 10, heated to a temperature value in the range from 50 °C to 65 °C. The bivalent metal ion concentration of the substream heated in this manner is increased by the addition of calcium chloride from a vessel 11. The substream heated in this manner is subjected, while passing through a temperature holding line 12, for instance, to a heat retention period of two to ten minutes. Thereafter, from the substream that is kept hot, in a separator 13, a second fat-depleted substream 14 is separated and recirculated into the infeed of microfiltration stage 4.

The plate separator can be a two-phase separator, which is also referred to as clarifying separator, or a three-phase separator, also referred to as separating separator. The operating principle of the first alternative is represented in FIG. 3(a), that of the second alternative in FIG. 3(b).

In FIG. 3(a) two superimposed plates 100, 100' of the clarifying separator plate pack that rotates on vertical axis of rotation 101 are schematically represented. The retentate to be separated, being kept hot, is supplied axially from the top, in the direction of arrow 102 and then runs from the bottom, in the direction of arrow 103, into the plate gap confined between the two plates 100, 100'. While passing through the plate gap, along path 104, by the action of centrifugal force, the high-fat phase is separated off and runs along path 105 to the plate 100 in FIG. 3(a). From there, along plate 100, it reaches the bottom and is ultimately discharged from the lower end of the plate gap, either continuously via nozzles or discontinuously by timed evacuations.

At the upper end of the plate gap, the light, low-fat phase 106 is discharged and recirculated in substreams to microfiltration stage 4.

In the case of the separating separator, whose operating principle is schematically illustrated in FIG. 3(b), the infeed also takes place along axis of rotation 201 of the rotating plate pack, axially from the top in the direction of arrow 202. In the plates 200, 200' of the plate pack, superimposed openings are embodied, which form a riser. Through this riser, the retentate, kept hot while running in vertically from the bottom up along arrow 203 into the plate gap confined between the plates 200, 200'. Subject to the action of centrifugal force, a fat-enriched phase is separated in the direction of upper plate 200 of FIG. 3(b) and runs along its wall on a path 204, to the lower end of the plate gap, where it is discharged either continuously via nozzles or discontinuously by timed evacuations. Moreover, a fat-enriched phase is separated off in the direction of the lower plate 200' in FIG. 3(b) and runs along its the wall on a path 205 to the upper end of the plate gap. There, this fat-enriched light phase is discharged as continuous stream 206. The remaining low-fat phase leaves the plate gap via the lower end of the latter along path 207 as heavy phase and is discharged as a continuous stream 208, which is recirculated in substreams to microfiltration stage 4.

In FIG. 2(b), separator 13 is illustrated as an example of such a separating separator. The recirculated substream 14 in FIG. 2 represents the low-fat phase of the separating separator. The paths 204 and 205 of the high-fat or fat-enriched phase supply a second fat-enriched substream 209. From there, these phases are supplied to further processing, not illustrated, into a phospholipid concentrate, from which ultimately a phospholipid powder is obtained. The first fat-enriched substream 255, separated off in the first stage 5.1, is also supplied to this processing arrangement. Also not illustrated is the path of the permeate from the additional ultrafiltration stage 7 and its further use.

LIST OF REFERENCE CHARACTERS

1 Block (Whey)
2 Ultrafiltration stage
3 Block
4 Microfiltration stage
5 Separation stage
5.1 First stage
5.2 Second stage
6 Recirculation
7 Additional ultrafiltration stage
9 Vessel
10 Plate heat exchanger
11 Vessel
12 Temperature holding line
13 Plate separator
14 Reduced-fat substream/second fat-depleted substream/recirculated substream
100, 100' Plate
101 Axis of rotation
102 Arrow
103 Arrow
104 Path
105 Path of the high-fat phase
106 Light low-fat phase
200, 200' Plate
201 Axis of rotation
202 Arrow
203 Arrow
204, Path of the high-fat phase
205 Path of the fat-enriched phase
206 Continuous stream
207 Path
208 Continuous stream
209 Second fat-enriched substream
250 Process step
251 Supply
252 Process step
253 Input
254 Cream separator
255 First fat-enriched substream
256 First fat-depleted substream

The invention claimed is:
1. Process for obtaining a constituent from a whey protein concentrate, comprising:
supplying a whey protein concentrate to a microfiltration arrangement to obtain a retentate stream;
in a first stage of separation, separating the retentate stream into a first fat-enriched substream and a first fat-depleted substream;
in a second stage of separation, separating the first fat-depleted substream into a second fat-enriched substream and a second fat-depleted substream; and
recirculating at least part of the second fat-depleted substream into the microfiltration arrangement as a recirculated substream.

2. Process according to claim 1, characterized in that the dry matter content of the retentate stream is adjusted to 5 to 7% ahead of the first stage.

3. Process according to claim 2, characterized in that the adjustment of the dry matter content takes place by diluting the retentate stream using a permeate from reverse osmosis.

4. Process according to claim 2, characterized in that the dry matter-adjusted retentate stream is heated to 40° C. to 50° C. prior to its separation.

5. Process according to claim 1 further comprising, obtaining a phospholipid concentrate from one or both of the first fat-enriched substream and the second fat-enriched substream.

6. Process according to claim 5 further comprising, obtaining a phospholipid powder from the phospholipid concentrate.

7. Process according to claim 1 further comprising, obtaining a protein-enriched product from a permeate stream from the microfiltration arrangement.

8. Process according to claim 1, characterized in that the quantity of the recirculated substream is in the range of 25% to 75% of the quantity of the second fat-depleted substream.

9. Process according to claim 1, characterized in that the residual fat content recirculated with the recirculated substream is reduced by microfiltration to a fraction that corresponds to its natural degree of defatting.

10. Process according to claim 9, characterized in that the natural degree of defatting of microfiltration is in the range of 75% to 80% and that the fraction of the recirculated residual fat content passing into a permeate stream from the microfiltration arrangement is in the range of 20% to 25%.

11. Process according to claim 1, characterized in that in the second stage, prior to separation, the pH of the first fat-depleted substream is adjusted, the pH-adjusted substream is heated and the bivalent metal ion concentration of the heated substream is increased.

12. Process according to claim 11, characterized in that the heating temperature of the first fat-depleted substream is in the range from 50° C. to 65° C.

13. Process according to claim 11, characterized in that the heated substream is passed through a temperature holding line.

14. Process according to claim 11, characterized in that the adjustment of the pH takes place by the addition of an alkali.

15. Process according to claim 11, characterized in that the adjustment of the pH to a value in the range of 6.4 to 7.0 takes place.

16. Process according to claim 11, characterized in that the increase in the bivalent metal ion concentration takes place by an addition of calcium chloride.

17. Process according to claim 11, characterized in that the second fat-depleted substream is taken from a discharge stream of a plate separator, to which the heated substream is supplied as a feed stream.

18. Process according to claim 17, characterized in that the plate separator is a two-phase separator, the discharge stream of which that discharges the light phase supplies the second fat-depleted substream.

19. Process according to claim 17, characterized in that the plate separator is a three-phase separator, the discharge stream of which that discharges the heavy phase supplies the second fat-depleted substream.

20. Process according to claim 7 further comprising, supplying the permeate stream from microfiltration to ultrafiltration and obtaining a protein-enriched product from a retentate stream of ultrafiltration.

\* \* \* \* \*